(12) United States Patent
Boyer

(10) Patent No.: US 8,881,006 B2
(45) Date of Patent: Nov. 4, 2014

(54) MANAGING DIGITAL SIGNATURES

(75) Inventor: John M. Boyer, Victoria (CA)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 13/274,679

(22) Filed: Oct. 17, 2011

(65) Prior Publication Data

US 2013/0097493 A1    Apr. 18, 2013

(51) Int. Cl.
  *G06F 17/21* (2006.01)
  *H04L 9/32* (2006.01)
  *G06F 21/64* (2013.01)

(52) U.S. Cl.
  CPC ............ *H04L 9/3236* (2013.01); *H04L 9/3247* (2013.01); *G06F 21/64* (2013.01)
  USPC ........................................................ 715/268

(58) Field of Classification Search
  CPC .................................................... G06F 17/241
  USPC ......................................................... 715/268
  See application file for complete search history.

(56) References Cited

U.S. PATENT DOCUMENTS

| | | | | |
|---|---|---|---|---|
| 5,315,504 | A * | 5/1994 | Lemble ............................ | 700/90 |
| 6,012,087 | A * | 1/2000 | Freivald et al. ................. | 709/218 |
| 7,073,122 | B1 * | 7/2006 | Sedghi ............................ | 715/234 |
| 7,406,599 | B1 * | 7/2008 | Pravetz et al. ................. | 713/176 |
| 7,533,268 | B1 * | 5/2009 | Catorcini et al. ............. | 713/176 |
| 7,568,101 | B1 * | 7/2009 | Catorcini et al. ............. | 713/176 |
| 7,694,145 | B1 * | 4/2010 | Pravetz et al. ................. | 713/176 |
| 7,770,009 | B2 * | 8/2010 | Miyazaki et al. ............. | 713/170 |
| 8,261,082 | B1 * | 9/2012 | Goldman ....................... | 713/176 |
| 8,433,909 | B1 * | 4/2013 | Sakkos et al. ................. | 713/170 |
| 2002/0013825 | A1 * | 1/2002 | Freivald et al. ................ | 709/218 |
| 2002/0174099 | A1 * | 11/2002 | Raj et al. ............................ | 707/1 |
| 2005/0050066 | A1 * | 3/2005 | Hughes .......................... | 707/100 |

(Continued)

FOREIGN PATENT DOCUMENTS

| | | |
|---|---|---|
| EP | 2202665 A1 | 6/2010 |
| WO | 2006049581 A1 | 5/2006 |

OTHER PUBLICATIONS

Ugur, Alper, and Ibrahim Sogukpinar. "A framework for licensed digital signatures." In Networks and Communications, 2009. NETCOM'09. First International Conference on, pp. 428-432. IEEE, 2009.*

(Continued)

*Primary Examiner* — Frank D Mills
(74) *Attorney, Agent, or Firm* — Cantor Colburn LLP; Edward Choi

(57) ABSTRACT

A method includes searching a data instance in a modular interactive document to identify completed digital signatures, validating the identified completed digital signatures, generating a signature information table that associates nodes of the data instance with signature information including an indicator of a digital signature status associated with each of the nodes, retrieving a page of the modular interactive document, retrieving data associated with the page and identifying nodes of data associated with user interface elements of the page, retrieving the digital signature status associated with the identified nodes of data associated with the user interface elements of the page from the signature information table, and presenting the page of the modular interactive document to the user on a display, the presented page including data corresponding to the identified nodes and an indication of the digital signature status associated with the data corresponding to the identified nodes.

20 Claims, 5 Drawing Sheets

(56) References Cited

U.S. PATENT DOCUMENTS

| | | |
|---|---|---|
| 2005/0063545 A1* | 3/2005 | Fujimoto et al. .............. 380/277 |
| 2005/0091261 A1* | 4/2005 | Wu et al. ....................... 707/102 |
| 2008/0097777 A1 | 4/2008 | Rielo |
| 2008/0235577 A1* | 9/2008 | Veluchamy et al. .......... 715/268 |
| 2008/0288532 A1* | 11/2008 | Aboukrat et al. ......... 707/103 R |
| 2009/0025087 A1* | 1/2009 | Peirson et al. .................. 726/27 |
| 2009/0031132 A1* | 1/2009 | Lehwany ...................... 713/176 |
| 2009/0158145 A1 | 6/2009 | Schering |
| 2009/0265558 A1* | 10/2009 | Izu et al. ....................... 713/176 |
| 2010/0031140 A1* | 2/2010 | Cummins .................... 715/236 |
| 2010/0037062 A1* | 2/2010 | Carney .......................... 713/176 |
| 2010/0100743 A1* | 4/2010 | Ali et al. ....................... 713/176 |
| 2010/0157365 A1* | 6/2010 | Jeong et al. ................... 358/1.15 |
| 2010/0293384 A1* | 11/2010 | Potkonjak ..................... 713/176 |
| 2011/0093777 A1* | 4/2011 | Dunn et al. ................... 715/268 |
| 2011/0116140 A1* | 5/2011 | Fry et al. ...................... 358/3.28 |
| 2012/0005570 A1* | 1/2012 | Hughes ......................... 715/234 |
| 2012/0023335 A1* | 1/2012 | Bals et al. ..................... 713/176 |
| 2012/0089841 A1* | 4/2012 | Boyer et al. .................. 713/175 |

OTHER PUBLICATIONS

Gondrom, Tobias. "Evidence Record Syntax—a new International Standard for Long-Term Archiving of Electronic Documents and Signed Data." In ISSE/SECURE 2007 Securing Electronic Business Processes, pp. 367-375. Vieweg, 2007.*

Hernandez-Ardieta, Jorge L., Ana I. Gonzalez-Tablas, Benjamin Ramos, and Arturo Ribagorda. "Extended electronic signature policies." In Proceedings of the 2nd international conference on Security of information and networks, pp. 268-277. ACM, 2009.*

Search Report for GB1217365.4, mailed Jan. 31, 2013, 5 pages.

* cited by examiner

Figure 4:
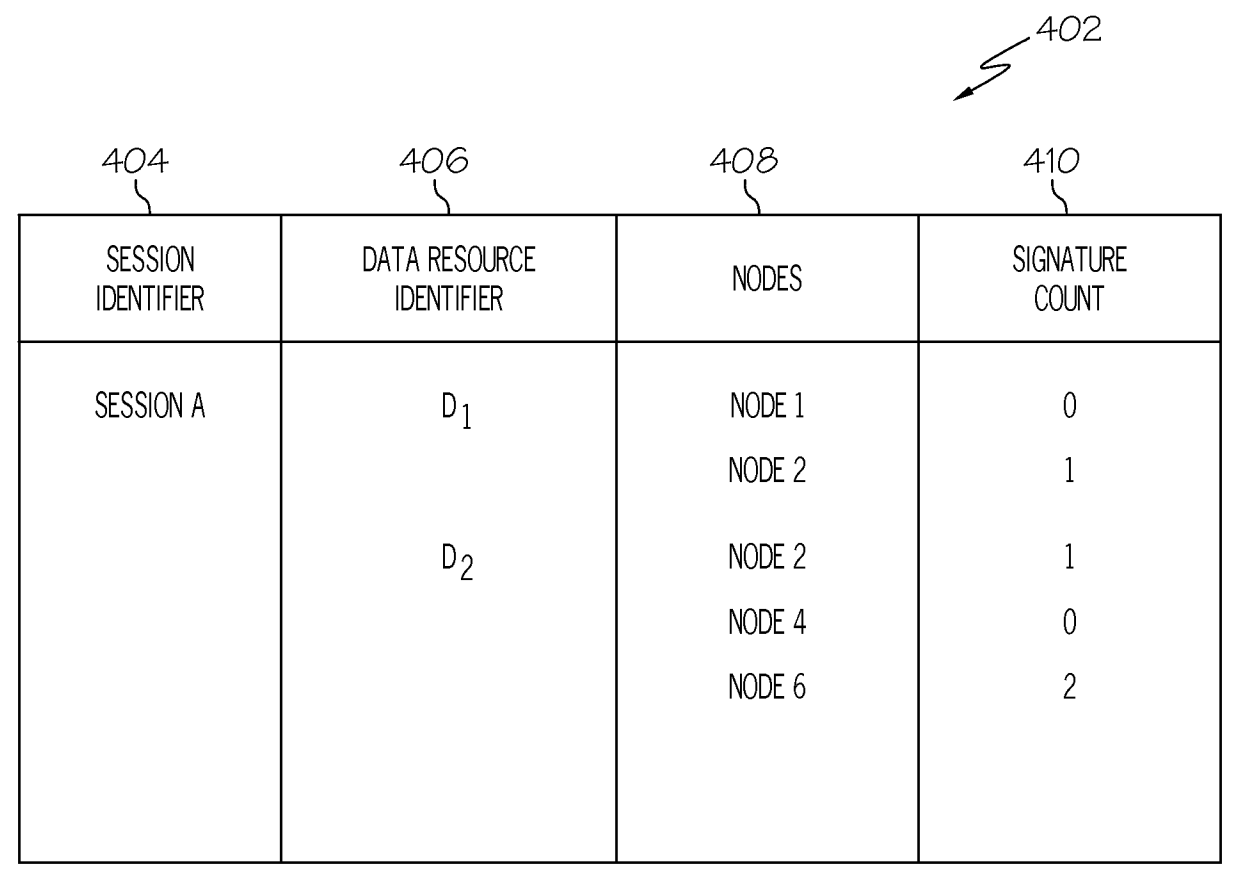

| SESSION IDENTIFIER 404 | DATA RESOURCE IDENTIFIER 406 | NODES 408 | SIGNATURE COUNT 410 |
|---|---|---|---|
| SESSION A | $D_1$ | NODE 1 | 0 |
|  |  | NODE 2 | 1 |
|  | $D_2$ | NODE 2 | 1 |
|  |  | NODE 4 | 0 |
|  |  | NODE 6 | 2 |

MANAGING DIGITAL SIGNATURES

BACKGROUND

The present invention relates to digital signatures, and more specifically, to managing digital signatures in interactive documents.

An interactive document such as, for example, an interactive web document (IWD) is a document that includes data and logic for presenting the data to a user. For example, a form may include data fields that may be filled with data by a user. Traditional documents may present the form and allow data entries by the user. The document may be saved with the data that has been entered by the user. An interactive form may include logic such that when the document is opened, the logic presents portions of the form to the user in a sequence. The logic may present different portions of the form to a user depending on the user inputs. A user may enter data into the form, and the data may be saved in the document.

Traditional documents allow a user to apply a digital signature to the form. The digital signature is unique to the user, and is used with an encryption or hashing scheme to prevent the signed document from being altered without invalidating the digital signature.

BRIEF SUMMARY

According to one embodiment of the present invention, a method includes opening a modular interactive document (MID) with a processor, searching a data instance in the modular interactive document to identify completed digital signatures, validating the identified completed digital signatures, generating a signature information table (SIT) that associates nodes of the data instance with signature information including an indicator of a digital signature status associated with each of the nodes, retrieving a page of the modular interactive document, retrieving data associated with the page and identifying nodes of data associated with user interface elements of the page, retrieving the digital signature status associated with the identified nodes of data associated with the user interface elements of the page from the signature information table, and presenting the page of the modular interactive document to the user on a display, the presented page including data corresponding to the identified nodes and an indication of the digital signature status associated with the data corresponding to the identified nodes.

According to another embodiment of the present invention, a system includes a display, and a processor communicatively connected to the display, the processor operative to open a modular interactive document (MID) with a processor, search a data instance in the modular interactive document to identify completed digital signatures, validate the identified completed digital signatures, generate a signature information table (SIT) that associates nodes of the data instance with signature information including an indicator of a digital signature status associated with each of the nodes, retrieve a page of the modular interactive document, retrieve data associated with the page and identifying nodes of data associated with user interface elements of the page, retrieve the digital signature status associated with the identified nodes of data associated with the user interface elements of the page from the signature information table, and present the page of the modular interactive document to the user on a display, the presented page including data corresponding to the identified nodes and an indication of the digital signature status associated with the data corresponding to the identified nodes.

According to yet another embodiment of the present invention, a non-transitory computer-readable storage medium including computer executable instructions that, when executed on a processor of a computer apparatus, direct the processor to perform a method for presenting data to a user, the method includes opening a modular interactive document (MID) with a processor, searching a data instance in the modular interactive document to identify completed digital signatures, validating the identified completed digital signatures, generating a signature information table (SIT) that associates nodes of the data instance with signature information including an indicator of a digital signature status associated with each of the nodes, retrieving a page of the modular interactive document, retrieving data associated with the page and identifying nodes of data associated with user interface elements of the page, retrieving the digital signature status associated with the identified nodes of data associated with the user interface elements of the page from the signature information table, and presenting the page of the modular interactive document to the user on a display, the presented page including data corresponding to the identified nodes and an indication of the digital signature status associated with the data corresponding to the identified nodes.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention, are apparent from the following detailed description taken in conjunction with the accompanying drawings in which:

FIG. 4 illustrates an exemplary embodiment of a signature information table.

DETAILED DESCRIPTION

Figure 1:
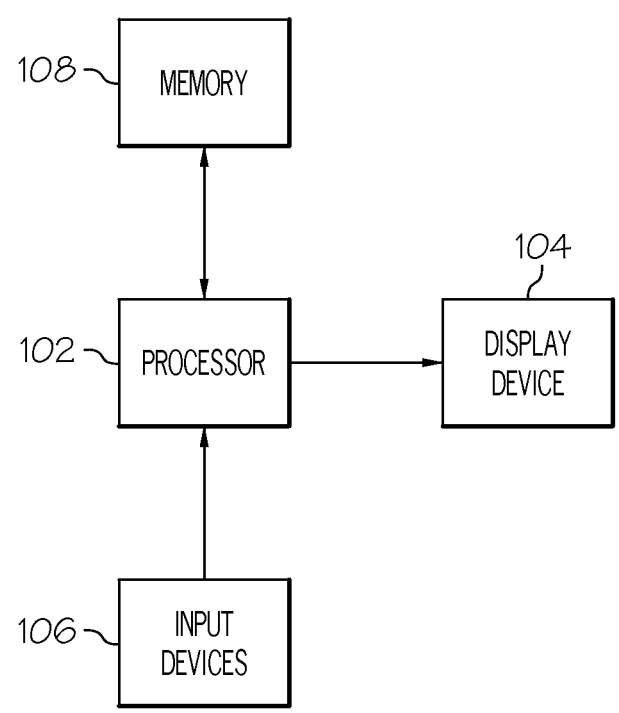
FIG. 1 illustrates an exemplary embodiment of a processing system.

FIG. 1 illustrates an exemplary embodiment of a processing system (system) 100. The system 100 includes a processor 102 that is communicatively connected to a display device 104, input devices 106, and a memory device 108. The processor 102 may also send and receive data from other processing devices via a communications connection that may be connected to a communications network (not shown).

Figure 2:
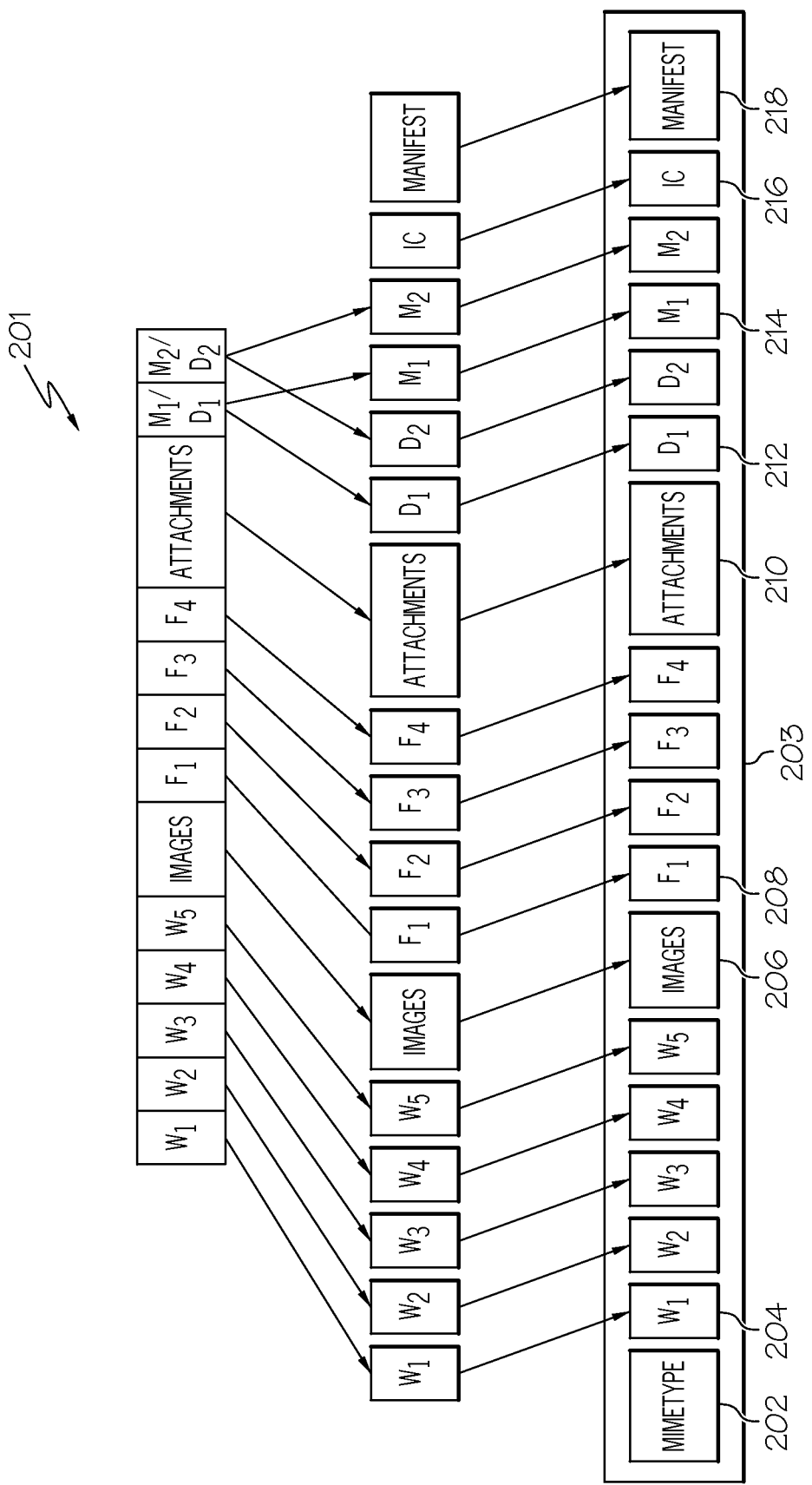
FIG. 2 illustrates an exemplary embodiment of a monolithic interactive document and a corresponding modular interactive document.

FIG. 2 illustrates an exemplary embodiment of a monolithic interactive document 201 and a corresponding modular interactive document (MID) 203 for a form type document. The modular interactive document 203 includes an optional mimetype element 202, zero or more wizard pages (illustrated as $W_{1-5}$) 204, optional images 206, zero or more form pages (illustrated as $F_{1-4}$) 208, optional attachments 210, one or more data instances (illustrated as $D_{1-2}$) 212, zero or more model elements (illustrated as $M_{1-2}$) 214, an optional interaction control (IC) element 216, and an optional manifest 218. The mimetype element 202 includes an identifier of the type of document. The processor 102 (of FIG. 1) may use the mimetype, if present, to help determine whether the document is a modular interactive document, or to make decisions about how to process the modular interactive document based on parameters within the mimetype. The wizard pages 204, if present, are components of the modular interactive document that may be used to present information, instructions, data, and data input fields to a user in small, step-by-step user interface sequences. The images 206 may include image files such as PNGs, GIFs or JPEGs that may be displayed by page components 204 or 208. The form pages 208, if present, are components of the modular interactive document that may be used to present information, instructions, data and data input fields to a user in user interface layouts that are more typically associated with printable sheets of paper, such as, for example, a page of an expense report form. Form pages 204 may be equipped with data input fields to collect data, or they may only be used to display or print data collected by wizard pages 204. Each user interface element within page components 204 or 208 may be a user editable data input field or it may only present a data value. The user interface definition of a MID 203 typically includes form pages 208 or wizard pages 204 or both. The attachments 210 may include attached documents such as scanned images of receipts or other forms. The data instances 212 include data that may be entered by a user, including complex data types such as digital signatures. In an exemplary embodiment, a referencing mechanism is used to make the association between user interface elements of page components 204 and 208 and the nodes of data that they present or make editable. In an alternate embodiment, the data instances 212 are not articulated components of the MID 203, but rather a containment mechanism is used to make the association between each user interface element of page components 204 and 208 and the node or nodes of data that it presents or makes editable. When a user interacts with a MID 203, the data collected from the user is stored in the data instances 212 of the MID 203. The model elements 214 include behavioral logic such as, for example, rules, computations, algorithms or other logic that may be performed following the input of data or instructions from a user. An example of a computation is a formula that determines the total value of an expense report based on the expense items and values entered by a user. An example of a rule is a constraint that identifies as invalid an expense report total or an expense report item exceeding a given value. An example of an algorithm is a sequence of actions performed after receiving the results of a web service during user interaction. An example of other logic The IC element 216 provides logical instructions for orchestrating the presentation of the wizard pages 204, the form pages 208, and data instances 212 to the user.

In the above described embodiments, the monolithic interactive document 201 is opened, processed, and presented to the user as a single document. Thus, when opened, a processor typically parses the content of all or most of the elements in the monolithic interactive document 201 and presents the document to the user. The MID 203 offers flexibility in that most of the elements of the MID 203 may be independently accessed and presented to the user without necessarily presenting the entire document to the user. Portions of the MID 203 may be independently parsed such that only a form or wizard page resource and the data components it references are parsed at any given time. In an exemplary embodiment, the processor 102 performs document processor functions and page renderer functions. The document processor functions apply logical instructions found in the MID 203 to process pages that will be presented to a user. The page renderer functions receive instructions from the document processor functions to present a particular page to a user. The page renderer functions create a parse tree from the data instances 212 and process the parse tree to present a page or pages to the user. Though the illustrated embodiment includes a single processor 102, different processors or any combination of processors may perform one or each of these functions. For example, a host processor may perform the document processor functions, for example on a server machine, and send instructions to the page renderer functions that may be performed by a client processor, for example in a javascript-enabled web browser. The host processor may be connected to the client processor via a communications network.

Digital signatures may be used to protect data that is entered into a document. For example, a user may be presented with a form for business expense reports. The user may fill in portions of the form and apply a digital signature to the document, including some or all of the data. The processing of the digital signature may include, for example, applying a signature filter that indicates what portion of the document content to sign; this may be done by indicating the entire document except for subtracting the portions of the document content that remain mutable in the business process after the digital signature is applied. Thus, the digital signature may be applied to some of the nodes in the document (the signed content), while leaving other nodes unsigned. A completed digital signature includes a hash value of the signed content that may be protected using a form of encryption that combines the hash value with the identity of the user. Thus, if the signed content is altered, the alteration may be detected via an invalid signature, i.e. a digital signature whose hash value, once decrypted, is not equal to a newly computed hash value of the signed content. An example validation test for a digital signature includes a test for equality between the hash value, once decrypted, and a newly computed hash value of the signed content of the digital signature. Other validation tests may be performed, such as, for example digital identity expiry and revocation tests. A valid digital signature is a digital signature that has passed all defined validation tests, and an invalid digital signature is a digital signature for which at least one validation test fails. Often, systems present an indication to a user if the signed content has been altered when the document is opened, while other systems may prevent a document from being opened if the signed content has been altered.

In many scenarios, it may be desirable to allow different users or the same user to apply a digital signature to different portions of a document at different times. For example, a first user may fill out portions of a business expense report that include a report of the business expenses. The first user may then sign the portion of the document that indicates the reported expenses. A second user, such as a supervisor, may then receive the document and review the data entered into the document by the first user. The second user may approve many but perhaps not all of the expenses, enter data that includes an indication of the approved expenses into the document, and apply a second digital signature to the data entered by the second user and possibly also the data or the signature of the first user. A third user, such as an accountant may receive the signed document and likewise enter data into the document, such as the specific accounts to which the various approved expenses are to be applied, and apply a third signature to the data entered by the third user and possibly the data or signatures of all prior users. In these cases, each user needs an indicator for user interface elements that are presenting data that has been signed so that they can be distinguished from user interface elements that are presenting unsigned data. In an exemplary embodiment, the edit functions of user interface elements that present signed data are disabled so that the presented data is read-only. Editing functions of a user interface element may be disabled for application-specific reasons other than association with a signed data node. One example includes user access control restrictions for MID 203 delivered to processor 102 by the consuming application. Another example includes logic rules or presentation rules embedded within the modular interactive document (MID) 203 that cause processor 102 to impart read only or hidden attributes to certain user interface elements. The association of a user interface element to a signed node includes an additional channel by which a read only restriction could be placed on a user interface element, and the association of a user interface element to an unsigned node allows the user interface element to behave according to any other rules that may be imparted by the processor 102.

When opening a monolithic interactive document 201, the user interface elements that present signed data may be distinguished because the whole document is processed and presented to the user. Similarly, the signature indicators of user interface elements of a monolithic interactive document 201 may be updated in response to the addition or deletion of a digital signature. For a MID 203, only one page of 204 or 208 may be rendered, along with the data associated with its user interface elements. A digital signature that signs some portion of the associated data may not even be contained within the associated data. For example, the digital signatures of MID 203 may be presented on a particular page that is distinct from the pages that collect all other non-signature data, and similarly the digital signatures may be placed in a data instance distinct from the data instances that store all other non-signature data of MID 203. It may be necessary, for example, to have the data instances for non-signature data conform to specific, predefined schema definitions that do not admit the storage of a digital signature within the data.

Figure 3:
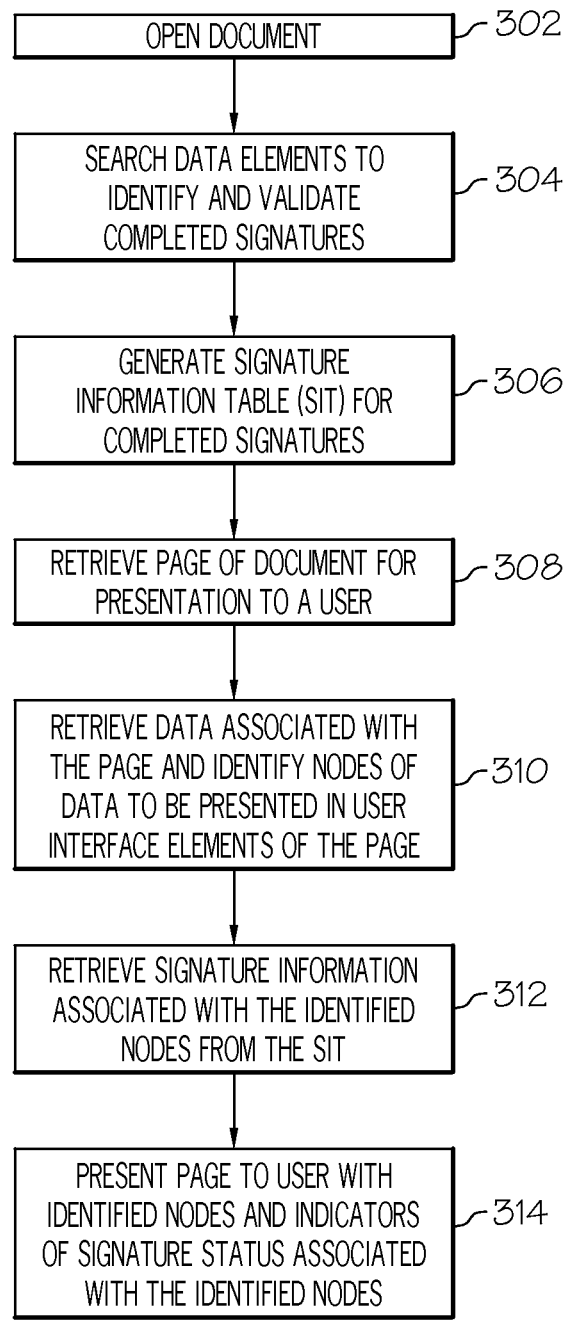
FIG. 3 illustrates a block diagram of an exemplary method that may be performed by the system of FIG. 1.

The methods and systems described below offer a method for creating and managing signature information for one or more digital signatures that sign different portions of a modular interactive document (MID) 203. In this regard, FIG. 3 illustrates a block diagram of an exemplary method that may be performed by the system 100 (of FIG. 1). Referring to FIG. 3, a MID 203 (of FIG. 2) is opened in block 302, including the determination of the various components of the MID 203 identified in FIG. 2. In block 304, the processor 102 searches the data instances 212 to locate and validate completed signatures that are stored in one or more of the data instances 212. In an exemplary embodiment, all data instances 212 in MID 203 are searched. In an alternate embodiment, only one or more specific data instances 212 are searched according to a configuration of processor 102. The validation of a digital signature includes the identification of nodes of data instances 212 that have been signed. In block 306, the processor 102 generates a signature information table (SIT). An exemplary embodiment of a SIT 402 is illustrated in FIG. 4. Referring to FIG. 4, the SIT 402 includes a data resource identifier column 406 that contains identifiers of data instances 212. A node column 408 contains identifiers of nodes that are located in the data instances 212. A signature count column 410 contains indicators of how many signatures have been applied to each particular node. In an exemplary embodiment, columns 406 and 408 of SIT 402 are represented by creating parse trees of data instances 212, and column 410 is then represented by decorating the parse tree nodes with their respective signature count values. For a given data node, the containing tree of the data node provides the data resource identifier 406, the node's path of ancestors in that tree provides the node identifier 408, and the decoration attached to the node provides signature information such as the signature count 410. For example, a node having a zero signature count indicates that the node has not been signed, where a node having an associated signature count that is greater than zero indicates that the node has been signed. Alternate embodiments may include additional signature information for each node, such as the list of digital signatures that contribute to the node's signature count. Alternate embodiments need not include the data resource identifier column 406 in SIT 402 if the node identifiers stored in node column 408 include an indication of the data instance resource identifier. For example, in the first row of FIG. 4, column 408 may include the expression instance('D1')/Node1 rather than Node1.

Referring back to FIG. 3, in block 308 a page that will be presented to the user on the display device 104 is retrieved from MID 203. In an exemplary embodiment, a server-side component of processor 102 obtains a page resource from the MID 203 and sends the page resource to a client-side component of processor 102 that implements the page renderer functions, such as a java script-enabled web browser. The client-side component parses the page resource including commands contained within the page resource that instruct the page renderer functions to obtain the data needed by the page resource as well a pertinent portion of SIT 402 from the server-side component of processor 102. In block 310, the data for the page is obtained and the nodes of data to be presented in user interface elements of the page are identified. The association mechanism, such as a reference or containment, is used to identify the data node for each user interface element in the page for the purpose of presentation of the data node's value in the user interface element. In block 312, the signature information is retrieved from the SIT for the identified nodes of data (i.e., the nodes that will be presented to the user). In block 314 of FIG. 3, the page is presented to the user with the identified nodes and an indication of the signature status of the presented nodes (i.e., an indicator of whether a node has been signed). The page renderer or the user interface definition of the page resource may be configured to always show the signature indicator or to only show it in special circumstances, such as if the user interaction cursor hovers over the user interface element bound to the signed node or if the user attempts to modify the data in the user interface element bound to the signed node.

For example, once a page has been identified or selected by the document processor functions for presentation to a user, the page renderer portion identifies, retrieves, and creates a parse tree for each data instance associated with the page. The nodes of each parse tree are then matched with the nodes in the nodes field 408 (of FIG. 4). When the page is presented to the user, the user interface elements of the page are associated with data nodes from at least one parse tree. The presented data that is associated with a signed node is presented along with an indicator of the signature status of the data (or node). Thus, if a node with a user's birth date has been signed, the birth date in the node may be presented to a user with an indicator, such as a visual or textual indicator, that indicates that the node has been signed. The page renderer or the user interface definition of the page resource may be configured to always show the signature indicator or to only show it under special circumstances.

Figure 5:
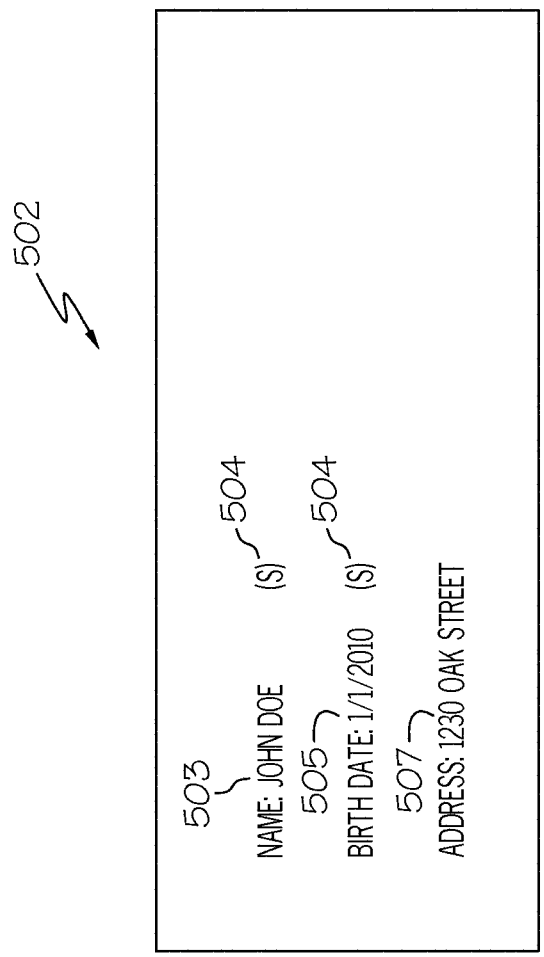
FIG. 5 illustrates an exemplary embodiment of a page presented to a user.

FIG. 5 illustrates an exemplary embodiment of a page 502 that has been presented to a user. The page includes a "Name" field 503 that corresponds to the "Node 2" (of FIG. 4), and "birth date" field 505 that corresponds to the "Node 6" that have been signed, as indicated by the signature indicator 504. The "address" field 507 that corresponds to the "Node 4" has not been signed, and thus, the signature status of the unsigned data or node is indicated by either the absence of the signature indicator 504 or another indicator that indicates an unsigned status.

Referring to FIG. 3, once the page has been presented to the user in block 314 with an indicator of the signature status of the presented nodes, the subsequent behavior of user interface elements may be affected by the signature status of the node it presents. Specifically, in an exemplary embodiment, a presented user interface element prevents the user from editing the data of the node if the signature status of the node indicates that it is signed. On the other hand, if a presented user interface element has not been made read only by application-specific rules and if it is associated with a node that is not signed, then the editing functions of the presented user interface element are enabled, and any user input other than the addition or deletion of a digital signature is stored in the node associated with the presented user interface element until a save operation occurs or until user interaction with the page ends.

The user interaction with a page may be ended by requesting the presentation of a new page of MID 203 or by requesting the end of interaction with the entire MID 203. When a save operation occurs or when interaction with a page ends, any user input changes in the nodes associated with the user interface elements are reflected in the data instances 212 of MID 203. If the user has requested presentation of a new page, then the presentation includes the processing corresponding to blocks 308 through 314 of FIG. 3. Once user interaction with MID 203 is terminated, a business process may store MID 203 in a content management system, or it may allow another user to begin interacting with MID 203, including the processing described herein and depicted in FIG. 3.

During user interaction with a page, the user may operate a user interface element that permits the addition or deletion of a digital signature. In an exemplary embodiment, the addition or deletion of a digital signature includes a number of additional steps. A save operation is performed to ensure that the data, including signatures, is up to date in MID 203. The signature information table (SIT) 402 is updated to reflect the addition or deletion of the signature. The presentation of the current page is updated to reflect changes in the pertinent portion of the SIT 402. The subsequent behavior of each user interface elements is affected according to the updated signature status of the node it presents.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for managing digital signature information regarding a modular interactive document, the method comprising:
    searching all data instances in the modular interactive document to identify completed digital signatures of one or more users;
    creating parse trees corresponding to the data instances, each parse tree including at least one node of data;
    associating each node of data with signature information corresponding to that node of data based on the identified digital signatures of one or more users;
    generating a signature information table including a list of all the nodes of data corresponding to all the data instances and the signature information associated with the nodes of data; and
    based on the signature information table, presenting on a display the modular interactive document along with one or more indicators indicating one or more corresponding nodes of data have been signed.

2. The method of claim 1, further comprising:
    determining whether a node associated with a user interface element in the modular interactive document is associated with signature information indicating the node is signed; and
    preventing editing of the data of the node with the user interface element responsive to determining that the node associated with the user interface element is signed.

3. The method of claim 2, further comprising:
    receiving input data from the user from a user interface element that is associated with a node that is not signed; and
    saving the input data in a data instance of the modular interactive document.

4. The method of claim 1, further comprising:
    performing a validation test on each completed digital signature; and
    outputting an indication to the user on the display that the completed digital signatures are not validated responsive to failing at least one validation test for at least one completed digital signature.

5. The method of claim 1, further comprising:
    adding a digital signature to a data instance of the modular interactive document; and
    updating the signature information table to include an association of a node corresponding to the data instance with signature information indicating the node is signed.

6. The method of claim 1, further comprising:
    deleting a digital signature from a data instance of the modular interactive document; and
    updating the signature information table to remove an entry associated with the deleted completed digital signature.

7. The method of claim 1, wherein the presenting the modular interactive document comprises:
    retrieving a portion of the modular interactive document;
    identifying the nodes of data associated with user interface elements of the portion;
    retrieving the signature information associated with the identified nodes of data from the signature information table;
    presenting the portion of the modular interactive document on the display; and presenting an indicator corresponding to an individual user interface element on the display indicating the node of data associated with the user interface element has been signed.

8. A system for managing digital signature information regarding a modular interactive document, the system comprising:
- a memory; and
- a processor communicatively connected to the memory, the processor operative to:
- search all data instances in the modular interactive document to identify completed digital signatures of one or more users;
- create parse trees corresponding to the data instances, each parse tree including at least one node of data;
- associate each node of data with signature information corresponding to that node of data based on the identified digital signatures of one or more users;
- generate a signature information table including a list of all the nodes of data corresponding to all the data instances and the signature information associated with the nodes of data; and
- present on a display the modular interactive document along with one or more indicators indicating one or more corresponding nodes of data have been signed based on the signature information table.

9. The system of claim 8, wherein the processor further is operative to:
- perform a validation test on each completed digital signature; and
- output an indication to the user on the display that the completed digital signatures are not validated responsive to failing at least one validation test for at least one completed digital signature.

10. The system of claim 8, wherein the processor is further operative to add a digital signature to a data instance of the modular interactive document, and update the signature information table to include an association of a node corresponding to the data instance with signature information indicating the node is signed.

11. The system of claim 8, wherein the processor is further operative to delete a digital signature from a data instance of the modular interactive document, and update the signature information table to remove an entry associated with the deleted completed digital signature.

12. The system of claim 8, wherein the processor is operative to present the modular interactive document by retreiving a portion of the modular interactive document, identifying the nodes of data associated with user interface elements of the portion, retrieving the signature information associated with the identified nodes of data from the signature information table, presenting the portion of the modular interactive document on the display, and presenting an indicator corresponding to an individual user interface element on the display indicating the node of data associated with the user interface element has been signed.

13. A non-transitory computer-readable storage medium including computer executable instructions that, when executed on a processor of a computer apparatus, direct the processor to perform a method for managing digital signature information regarding a modular interactive document, the method comprising:
- searching all data instances in the modular interactive document to identify completed digital signatures of one or more users;
- creating parse trees corresponding to the data instances, each parse tree including at least one node of data;
- associating each node of data with signature information corresponding to that node of data based on the identified digital signatures of one or more users; and
- generating a signature information table including a list of all the nodes of data corresponding to all the data instances and the signature information associated with the nodes of data; and
- based on the signature information table, presenting on a display the modular interactive document along with one or more indicators indicating one or more corresponding nodes of data have been signed.

14. The non-transitory computer-readable storage medium of claim 13, the method further comprising:
- adding a digital signature to a data instance of the modular interactive document; and
- updating the signature information table to include an association of a node corresponding to the data instance with signature information indicating the node is signed.

15. The non-transitory computer-readable storage medium of claim 13, the method further comprising:
- deleting a digital signature from a data instance of the modular interactive document; and
- updating the signature information table to remove an entry associated with the deleted completed digital signature.

16. The method of claim 1, wherein the signature information includes a digital signature status indicating whether each node of data is associated with a digital signature.

17. The method of claim 1, wherein the signature information includes a signature count indicating the number of digital signatures associated with each node of data.

18. The method of claim 1, wherein the signature information includes a list of all digital signatures associated with each node of data.

19. The method of claim 7, wherein the portion of the modular interactive document includes at least one selected from a form page or a wizard page.

20. The non-transitory computer-readable storage medium of claim 13, wherein the presenting the modular interactive document comprises:
- retrieving a portion of the modular interactive document;
- identifying the nodes of data associated with user interface elements of the portion;
- retrieving the signature information associated with the identified nodes of data from the signature information table;
- presenting the portion of the modular interactive document on the display; and
- presenting an indicator corresponding to an individual user interface element on the display indicating the node of data associated with the user interface element has been signed.

* * * * *